US010732888B1

(12) United States Patent
Chen et al.

(10) Patent No.: US 10,732,888 B1
(45) Date of Patent: Aug. 4, 2020

(54) SEAMLESS TRANSITIONING AMONG REPLICATION MODES IN A STORAGE SYSTEM (71) Applicant: EMC IP Holding Company LLC, Hopkinton, MA (US)

(72) Inventors: Xiangping Chen, Sherborn, MA (US); Svetlana Kronrod, Concord, MA (US)

(73) Assignee: EMC IP Holding Company LLC, Hopkinton (GB)

( * ) Notice: Subject to any disclaimer, the term of this patent is extended or adjusted under 35 U.S.C. 154(b) by 0 days.

(21) Appl. No.: 16/254,899

(22) Filed: Jan. 23, 2019

(51) Int. Cl.
G06F 12/00 (2006.01)
G06F 3/06 (2006.01)

(52) U.S. Cl.
CPC .............. G06F 3/065 (2013.01); G06F 3/067 (2013.01); G06F 3/0619 (2013.01); G06F 3/0634 (2013.01)

(58) Field of Classification Search
CPC combination set(s) only.
See application file for complete search history.

(56) References Cited

U.S. PATENT DOCUMENTS

| 7,475,124 | B2 | 1/2009 | Jiang et al. |
| 8,327,103 | B1 | 12/2012 | Can et al. |
| 8,380,928 | B1 | 2/2013 | Chen et al. |
| 8,429,346 | B1 | 4/2013 | Chen et al. |
| 8,515,911 | B1 | 8/2013 | Zhou et al. |
| 8,539,148 | B1 | 9/2013 | Chen et al. |
| 8,566,483 | B1 | 10/2013 | Chen et al. |
| 8,583,607 | B1 | 11/2013 | Chen et al. |
| 8,683,153 | B1 | 3/2014 | Long et al. |
| 8,712,976 | B1 | 4/2014 | Chen et al. |
| 8,775,388 | B1 | 7/2014 | Chen et al. |
| 8,782,324 | B1 | 7/2014 | Chen et al. |
| 8,799,601 | B1 | 8/2014 | Chen et al. |
| 8,909,887 | B1 | 12/2014 | Armangau et al. |
| 8,930,746 | B1 | 1/2015 | Chen et al. |
| 8,954,699 | B1 | 2/2015 | Chen et al. |
| 8,977,812 | B1 | 3/2015 | Chen et al. |
| 9,152,336 | B1 | 10/2015 | Chen et al. |
| 9,304,889 | B1 | 4/2016 | Chen et al. |

(Continued)

OTHER PUBLICATIONS

U.S. Appl. No. 16/048,767, filed Jul. 30, 2018, Chen et al.

(Continued)

Primary Examiner — Yong J Choe
(74) Attorney, Agent, or Firm — Daly, Crowley Mofford & Durkee, LLP (57) ABSTRACT In one aspect, transitioning among replication modes in a storage system is provided. An aspect includes during an active replication session in which a first replication mode is performed, validating a precondition for transitioning to a second replication mode that is different from the first mode of replication. An aspect further includes suspending data flow for the active session, establishing a base snap set pair for a mode transition cycle, and preparing for the transitioning including updating, for the mode transition cycle, the base snap set pair on both a source system and a target system of the storage system, and creating a snap set against an active snap set on the target system as a mode transition cycle snap set. An aspect further includes implementing the mode transition cycle, and entering a replication session, upon completion of the mode transition cycle, for the second mode of replication.

20 Claims, 6 Drawing Sheets

(56) References Cited

U.S. PATENT DOCUMENTS

| | | |
|---|---|---|
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,235,066 B1 | 3/2019 | Chen et al. |

OTHER PUBLICATIONS

U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 15/076,775, filed Mar. 22, 2016, Chen et al.
U.S. Appl. No. 15/085,188, filed Mar. 30, 2016, Meiri et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 15/885,027, filed Jan. 31, 2018, Chen et al.
U.S. Appl. No. 16/042,363, filed Jul. 23, 2018, Chen et al.
U.S. Appl. No. 16/038,543, filed Jul. 18, 2018, Chen et al.

| | SYNC | ASYNC | METRO | ALL |
|---|---|---|---|---|
| VALIDATE PRECONDITION | TRANSITIONING FROM: DETERMINE AVAILABILITY OF RECOVERY SNAP SET PAIRS | TRANSITIONING FROM: DETERMINE AVAILABILITY OF SYNCHRONIZED CYCLE SNAP SET PAIRS | TRANSITIONING FROM: DETERMINE AVAILABILITY OF RECOVERY SNAP SET PAIRS | SESSION IN STABLE STATE; PENDING MODE RQST; SUFFICIENT RESOURCES |
| SUSPEND DATA FLOW | TRANSITIONING FROM: STOP IO MIRRORING IN DATA PATH | TRANSITIONING FROM: WAIT FOR CURRENT CYCLE TO COMPLETE | TRANSITIONING FROM: STOP IO MIRRORING IN DATA PATH | |
| ESTABLISH BASE SS | LAST RECOVERY SNAP SET PAIR | LAST SYNCHRONIZED SNAP SET PAIR | LAST RECOVERY SNAP SET PAIR | |
| PREPARE TRANSITION | TRANSITIONING FROM: ASSIGN TRANSITION CYCLE BASE SNAP SET TO LAST RECOVERY SNAP SET | TRANSITIONING FROM: ASSIGN TRANSITION CYCLE SS USING LAST SYNCHRONIZED SS | TRANSITIONING FROM: ASSIGN TRANSITION CYCLE BASE SNAP SET TO LAST RECOVERY SNAP SET | UPDT MODE TRANSITION CYCLE BASE SS ON S & T; CREATE SS AGAINST ACTIVE SS ON TARGET AS MODE TRANSITION CYCLE SS |
| START MODE TRANSITION CYCLE | TRANSITION TO: ENABLE DATA MIRRORING ON SOURCE CG | TRANSITION TO: SET RECOVERY DATA REPLICATION FLOW FROM SOURCE TO TARGET | TRANSITION TO: ENABLE DATA MIRRORING ON SOURCE CG | |
| START TRANSITION REPLICATION CYCLE | TRANSITION TO: TRANSFER DELTA BETWEEN CG ON SOURCE AND LAST TRANSITION CYCLE BASE SS TO TARGET TRANSITION CYCLE SS | TRANSITION TO: CREATE NEW TRANSITION CYCLE SS AGAINST CG ON SOURCE; XFR DELTA BETWEEN NEW CYCLE SS & LAST ACTIVE SS TO TARGET TC SS | TRANSITION TO: TRANSFER DELTA BETWEEN CG ON SOURCE AND LAST TRANSITION CYCLE BASE SS TO TARGET TRANSITION CYCLE SS | |
| POST PROCESS | TO ENTER SYNC: ASSIGN ACTIVE SS TO TRANSITION CYCLE SS, IO MIRRORING FROM SOURCE CG TO TARGET ACTIVE SS | TO ENTER ASYNC, START ASYNC REPLICATION CYCLE SCHEDULING | TO ENTER METRO, REFRESH CG TO TRANSITION CYCLE SS, START BI-DIRECTIONAL IO MIRRORING | |

SEAMLESS TRANSITIONING AMONG REPLICATION MODES IN A STORAGE SYSTEM

BACKGROUND

A replication session can be implemented using various replication modes, such as synchronous (sync) replication, asynchronous (async) replication, and active/active replication, which as also known as metro replication.

Sync replication is a business continuity process that mirrors data updates between two systems to prevent data loss and downtime. When sync replication is turned on for a production storage object, the system mirrors the data to a target system as part of handling write requests from an initiator, and only responds to the initiator after the writes have been persisted on both the source and target systems.

In asynchronous (async) replication, once data has been written to a primary storage or production location, additional write operations to the primary storage can be performed without having to wait for the secondary or target storage site to complete its write operations.

Active/Active replication (also known as "metro replication") enables multiple database instances to support a common application. Synchronization among the databases is achieved through bidirectional replication capabilities.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for seamless transitioning among replication modes in a storage system. The method includes, during an active replication session in which a first mode of replication is performed at the storage system, validating a precondition for transitioning to a second mode of replication. The second mode of replication is different from the first mode of replication. The method also includes suspending data flow for the active replication session, establishing a base snap set pair for a mode transition cycle, and preparing for the transitioning from the first replication mode to the second replication mode including updating, for the mode transition cycle, the base snap set pair on both a source system and a target system of the storage system, and creating a snap set against an active snap set on the target system as a mode transition cycle snap set. The method further includes implementing the mode transition cycle, and entering a replication session, upon completion of the mode transition cycle, for the second mode of replication.

Another aspect may provide a system to provide seamless transitioning among replication modes in a storage system. The system includes a memory having computer-executable instructions. The system also includes a processor operated by a storage system. The processor executes the computer-executable instructions. When executed by the processor, the computer-executable instructions cause the processor to perform operations. The operations include, during an active replication session in which a first mode of replication is performed at the storage system, validating a precondition for transitioning to a second mode of replication. The second mode of replication is different from the first mode of replication. The operations also include suspending data flow for the active replication session, establishing a base snap set pair for a mode transition cycle, and preparing for the transitioning from the first replication mode to the second replication mode including updating, for the mode transition cycle, the base snap set pair on both a source system and a target system of the storage system, and creating a snap set against an active snap set on the target system as a mode transition cycle snap set. The operations further include implementing the mode transition cycle, and entering a replication session, upon completion of the mode transition cycle, for the second mode of replication.

Another aspect may provide a computer program product embodied on a non-transitory computer readable medium. The computer program product includes instructions that, when executed by a computer at a storage system, causes the computer to perform operations. The operations include, during an active replication session in which a first mode of replication is performed at the storage system, validating a precondition for transitioning to a second mode of replication. The second mode of replication is different from the first mode of replication. The operations also include suspending data flow for the active replication session, establishing a base snap set pair for a mode transition cycle, and preparing for the transitioning from the first replication mode to the second replication mode including updating, for the mode transition cycle, the base snap set pair on both a source system and a target system of the storage system, and creating a snap set against an active snap set on the target system as a mode transition cycle snap set. The operations further include implementing the mode transition cycle, and entering a replication session, upon completion of the mode transition cycle, for the second mode of replication.

BRIEF DESCRIPTION OF THE DRAWINGS

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 4 is a diagram depicting an example framework for implementing seamless transitioning among replication modes in accordance with an illustrative embodiment;

DETAILED DESCRIPTION

Synchronous (sync), asynchronous (async), and metro replication modes each offers different levels of data protection and also replicates different objects to a remote or target cluster. For example, async replication replicates data changes in cycles with the cycle intervals determined by recovery point object (RPO) settings. Sync replication mirrors each data write operation of a production consistency group (CG) to an active snap set at a remote or target system. Metro replication intercepts application write operations to a production CG on both a source and target system of the storage system and mirrors the write operations to a peer production CG at a remote cluster.

Based on changing operational and performance requirements of a business or organization, there are instances in which switching among these modes can be advantageous to business operations. Each of these modes offers distinct advantages and disadvantages. For example, one advantage to sync replication is that there is typically no data loss during site disaster recovery, and no additional on disk data and metadata read operations, as incoming data gets mirrored to the remote site during the write operations. In addition, sync replication by design also offers reduced snap creation/deletion operations, which can reduce latencies in the replication process. On the other hand, when using sync replication a user may experience higher input/output (TO) latency or even IO timeouts if the system is overloaded, or when there is network congestion between a source and target site. In other words, while sync replication provides greater protection, it requires that the system have sufficient capacity and that the data update patterns are relatively consistent.

In async replication, there is little impact on the host IO latency as data is replicated by a background process after it has been written. Potentially, much less data could be replicated using techniques such as write aggregation, compression, and deduplication. Another advantage of async replication is that is allows more control over how the process uses system resources via RPOs and bandwidth limits' settings, etc. It also adds system load by periodically creating/deleting snap sets, and reading/scanning snap data content for data replication. Increases to RPO setting of async replication reduce burden and async replication snap creation/deletion/scan overhead. However, it also increases the replication lag time between the source and target systems. In addition, during disaster recovery, there may be increased lag times between the source and target systems, as the content on the target may not be up to date.

Advantages of metro replication include continuous operations; that is, applications can continue to run even when a server is lost or when a storage system is taken offline. In addition, metro replication enables easy and seamless storage migration, active/active stretch clusters, and active/passive stretch clusters in situations where application objects are not LU-aligned.

In view of the above-referenced advantages and disadvantages, switching among these replication modes can be desirable in order to provide optimal data protection as well as overall system performance. However, switching among them can be challenging as different modes require different preconditions to be enabled. In addition, without an effective framework, transitioning between modes could potentially cause up to six different switch flows, and each flow would require several different states to handle the transitions.

The embodiments described herein provide a way to support all combinations of mode switching, which can greatly simplify the development and testing efforts of replication mode transitions. A solution includes a framework that identifies generic functions common to all replication modes and adjusts for certain (custom) functions that are particular to each of the replication modes.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "I/O request" or simply "I/O" or "TO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a consistency group (CG) may refer to a technique for protecting data in a replication process. A consistency group ensures that all write operations to a production volume are also written to a corresponding copy or copies in write-order so that the copy can be relied on for use, if needed, instead of the production volume.

In certain embodiments, a snapshot may refer to differential representations of an image, i.e. the snapshot may have pointers to the original volume and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable re representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having I/O interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Figure 1:
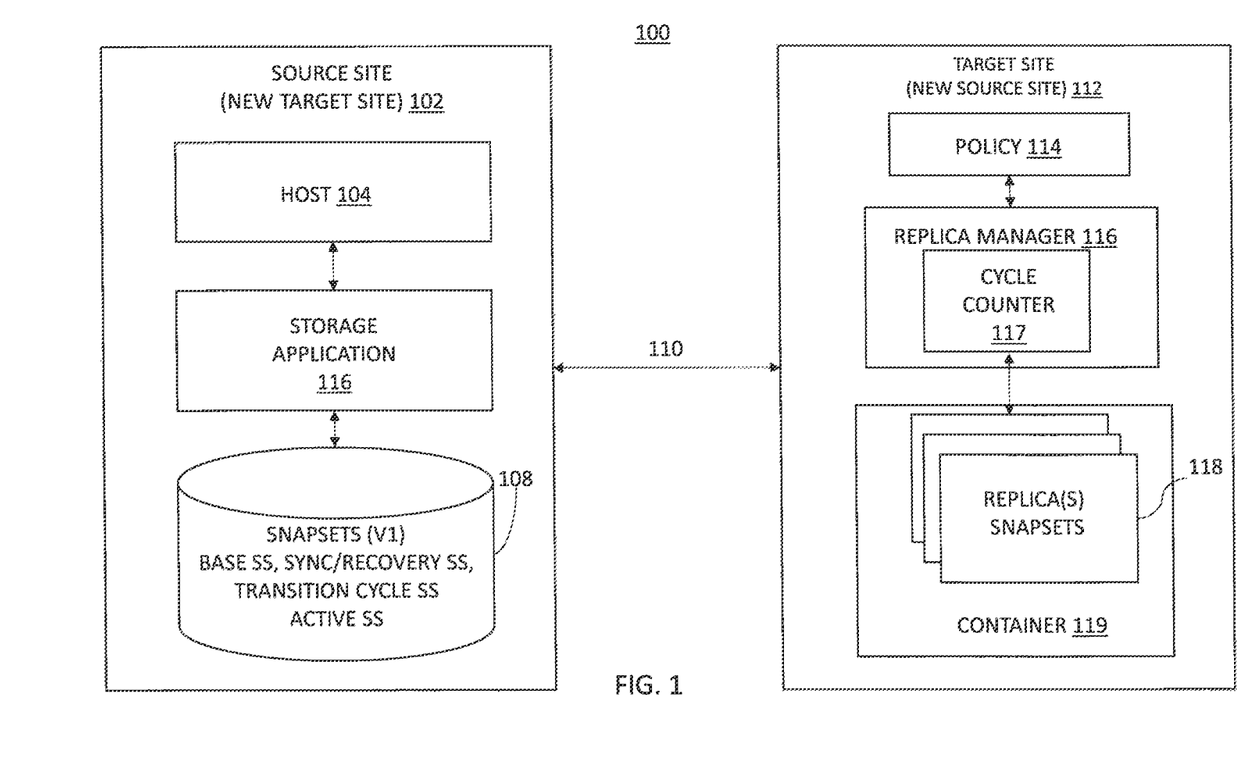
FIG. 1 is a block diagram of a storage system to perform seamless transitioning among replication modes in accordance with an illustrative embodiment.

Turning now to FIG. 1, an example storage system 100 for performing seamless transitioning among replication modes will now be described. Storage system 100 may include at least one source site 102 and at least one target site 112. In an embodiment, target site 112 is either co-located with source site 102 or is in close geographic proximity (e.g., within the same building or building complex) with the source site 102. In other embodiments, target site 112 is remotely located from the source site 102. For example, target site 112 may be geographically dispersed across cities, states, or even countries with respect to source site 102.

Source site 102 may include a host 104, a storage application 106, and data storage 108. In some embodiments, data storage 108 may include one or more storage volumes (e.g., V1), that operate as active, or production, volumes.

Host 104 may perform I/O operations on storage 108 (e.g., read data from and write data to storage 108). In some embodiments, the I/O operations may be intercepted by and controlled by the storage application 106. As changes are made to data stored on storage 108 via the I/O operations from host 104, or over time as storage system 100 operates, storage application 106 may perform data replication from the source site 102 to the target site 112 over a communication network 110.

In some embodiments, the communication network 110 may include internal (e.g., short distance) communication links (not shown) to transfer data between storage volumes for storing replicas 118 (also referred to herein as snap sets), such as an InfiniBand (IB) link or Fibre Channel (FC) link. In other embodiments, the communication link 110 may be a long-distance communication network of a storage area network (SAN), e.g., over an Ethernet or Internet (e.g., TCP/IP) link that may employ, for example, the iSCSI protocol.

In illustrative embodiments, storage system 100 may employ a snap set (or replication) mechanism to replicate data between source site 102 and target site 112. A snap set (or replica) may be created from data within storage 108 and transferred to the target site 112 during a data replication cycle using a data replication process, such as sync replication, async replication, and/or metro replication.

Data replication may be performed based on data replication policies that may define various settings for data recovery operations, shown as policy 114 in target site 112. For example, policy 114 may define a plurality of attributes, such as a frequency with which replicas are generated and how long each replica 118 is kept at target site 112. In some embodiments, policy 114 defines metrics for use in snap set creation and replication process determinations.

Policy 114 may define attributes for determining when to switch replication modes between sync, async, and metro replication modes. In embodiments, the policy 114 may define customer-selected requirements with respect to operational efficiencies. For example, a customer may indicate a desire or preference to use synchronous replication unless or until existing activities are impacted by performance and/or data safety issues, and then the customer desires to use async replication. In other embodiments, the switch among replication modes may be initiated upon request by an administrator or representative of the storage system.

As described herein, in example embodiments, the data replication mode performed by the system may be synchronous data replication with snap sets created in dynamic intervals during operation of storage system 100. The timing of synchronous replication cycles and the retention of the replicas 118 may be managed by replica manager 116 of target site 112. In some embodiments, the data replication mode may be asynchronous data replication. In other embodiments, the data replication mode may be metro replication.

In addition to managing replicas 118 according to a policy 114 (e.g., a replication and/or retention policy), the replica manager 116 may also include a cycle counter 117 to track generations of snap sets over time. The replica manager 116 may facilitate the transition functions described herein.

It will be understood that the roles of the source site 102 and the target site 112 may be reversed in instances, e.g., in which an event occurring on the source site 102 causes the target site 112 to intercept I/Os and take on the role of snap set creation and replication to the source site. This role reversal is referred to as a failover event. In this manner, the processes described herein apply equally to the target site. In this instance, the source site 102 becomes the new target site, and the target site 112 becomes the new source site, as shown in FIG. 1.

Figure 2:
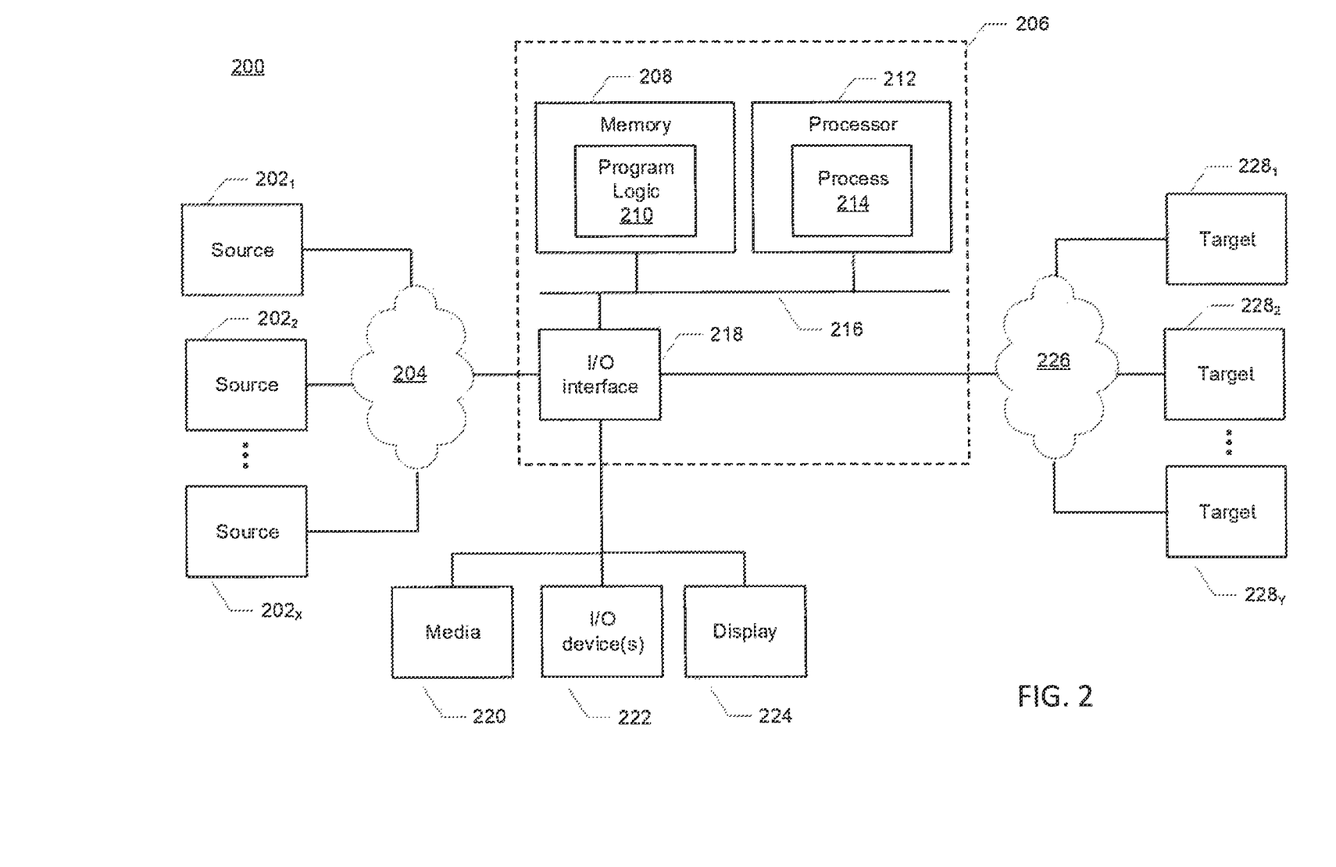
FIG. 2 is a block diagram of another storage system to perform seamless transitioning among replication modes in accordance with an illustrative embodiment.

Referring now to FIG. 2, in an illustrative embodiment, an apparatus 206 may form part of system 200 and include a memory 208 storing program logic 210, a processor 212 for executing a process 214, and a communications I/O interface 218, connected via a bus 216 to allow communication between memory 208, processor 212 and devices external to apparatus 206. Apparatus 206 may correspond to elements of the source site 102 of FIG. 1. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via a network 204. Source devices $202_1$-$202_X$ may correspond to elements of the source site 102 in FIG. 1. In some embodiments, communications I/O interface 218 may couple apparatus 206 to one or more target devices $228_1$-$228_Y$ via networks 226. Target devices $228_1$-$228_Y$ may correspond to elements of the target site 112 in FIG. 1. In some embodiments, networks 226 of FIG. 2 may include a communication fabric between volumes of targets 228. For example, in some embodiments, networks 226 may include an InfiniBand (IB) network or a Fibre Channel (FC) network. Networks 226 may also include a long-distance communication network of a storage area network (SAN), e.g., over an Ethernet or Internet (e.g., TCP/IP) link that may employ, for example, the iSCSI protocol.

Figure 3:
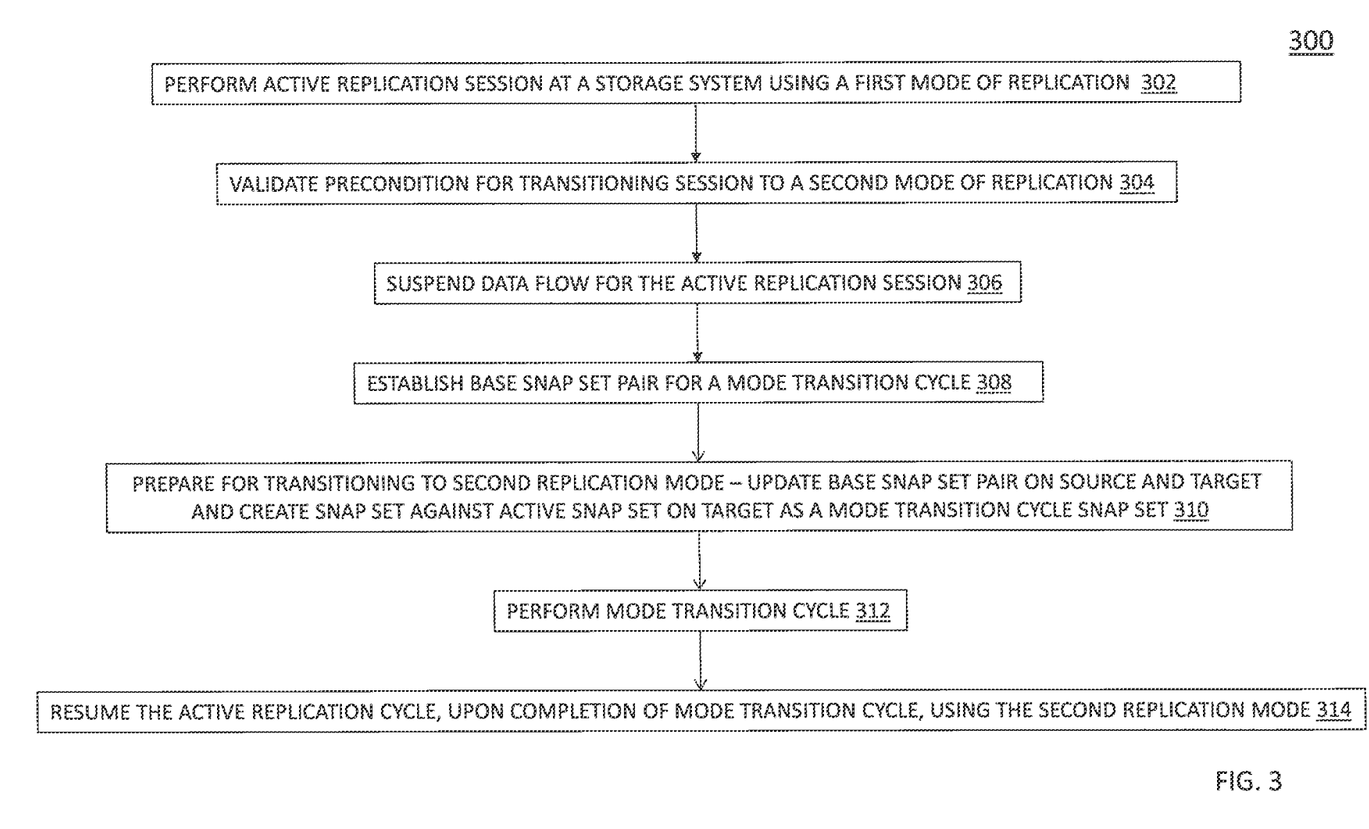
FIG. 3 is a flow diagram of a process for performing seamless transitioning among replication modes in accordance with an illustrative embodiment.

Turning now to FIG. 3, a flow diagram of a process 300 for performing seamless transitioning among replication modes in a storage system will now be described. The process 300 assumes that an active replication session is in process for a first mode of replication (block 302). The first mode can be any of sync, async, or metro replication modes.

In block 304, the process 300 validates a precondition for transitioning to a second mode of replication. The second mode of replication is different than the first mode of replication and can be any mode of replication other than the first mode of replication.

In block 306, the process 300 suspends the data flow for the active replication session. The process 300 suspends IO write operations from the source system to a target system (e.g., a device at the source system or a device at the target system).

In block 308, the process 300 establishes a base snap set pair for a mode transition cycle. The particular base snap set pair established will depend upon the mode of replication from which the replication session is transitioned. This step is further described in FIG. 4.

In block 310, the process 300 prepares for the transitioning from the first replication mode to the second replication mode by updating the base snap set pair on both the source system and the target system of the storage system. This step is further described in FIG. 4.

In block 312, the process 300 implements the mode transition cycle, and upon completion of the mode transition cycle, the process resumes the active replication session using the second replication mode in block 314. These steps are further described in the framework of FIG. 4, in which the process 300 incorporates the functions of the framework.

Turning now to FIG. 4, a framework 400 for seamlessly transitioning among replication modes in a storage system will now be described. As indicated above, the framework 400 identifies generic functions common to all replication modes and adjusts for certain functions that are particular to each of the replication modes. The generic functions common to all of the replication modes are illustrated in column 410, and the customized functions particular to each of the modes are shown in respective columns 404, 406, and 408.

Custom and generic functions are described with respect to the transition features described in FIG. 3, which are shown in column 402.

A generic function common to all replication modes is performed as part of a precondition validation feature. As shown in column 410, validating preconditions includes determining the stability of the session state and that sufficient system resources are available to transition between replication modes. Examples of system resources include additional volume slots and additional capacity for snap creation, to name a few. Generic functions also include identifying a mode request, e.g., from a customer.

Customized precondition validations for mode transitions are performed for each mode of replication as well. In column 404, precondition validations for transitioning from sync replication mode include determining the availability of recovery snap set pairs, which are used as a base snap set pair in a mode transition cycle process. Likewise, validations for transitioning from metro replication mode include determining the availability of recovery snap set pairs (as shown in column 408) for use as a base snap set pair during the mode transition cycle process. In column 406, precondition validations for transitioning from async replication mode include determining the availability of verified and synchronized snap set pairs for use as the base snap set pair in the mode transition cycle process.

Prior to transitioning between replication modes, data flow for the active replication cycle is suspended. In order to transition from async replication mode to sync or metro replication mode, data is suspended by waiting for the current cycle to complete (column 406). In transitioning from sync or metro replication mode to async replication mode, data flow is suspended by stopping IO mirroring in the data path of the session (columns 404, and 408, respectively).

Also prior to transitioning between replication modes, a base snap set pair is established for use in the mode transition cycle. In transitioning from sync or metro replication mode, the base snap set pair is the most recent recovery snap set pair from the sync/metro replication session (columns 404 and 408, respectively), while in transitioning from async replication mode to either sync or metro replication mode, the base snap set pair is the most recent synchronized (and verified) snap set pair from the async replication session (column 406).

In preparing for the transition between replication modes, a generic function that is common to all replication modes includes updating a mode transition cycle base snap set (SS) on the source and target (column 410). Another generic function includes creating a snap set against an active snap set on the target system as a mode transition cycle snap set (column 410).

Customized functions in preparing for the transition are performed. This preparation includes, in transitioning from sync or metro replication to async replication, a mode transition cycle base snap set is assigned to a most recent recovery snap set (columns 404 and 408, respectively). In transitioning from async replication to sync or metro replication, the custom preparation includes assigning a mode transition cycle snap set using the most recent synchronized snap set (column 406).

The mode transition cycle is performed via custom functions for each of the replication modes. In transitioning to async mode from sync or metro replication mode, data mirroring is enabled on the source system (consistency group) (columns 404 and 408, respectively). In transitioning to sync or metro mode from async mode, recovery data replication flow is set from the source system to the target system (column 406).

As part of the mode transitioning, a transition replication cycle is performed via customized functions for each of the replication modes. In transitioning to sync or metro replication from async replication, a delta between the consistency group and the last transition cycle base snap set is transferred to a target transition cycle snap set (columns 404 and 408, respectively). The mode transitioning cycle custom functions also include, in transitioning to sync or metro replication from async mode, transferring a delta between the consistency group at the source system and a most recent base snap set from the mode transition cycle to the mode transition cycle snap set at the target system (columns 404 and 408, respectively). In transitioning to async replication from sync or metro mode, the custom functions of the mode transitioning cycle include creating a new transition cycle snap set against the consistency group on the source system, and transferring a delta between the new transition cycle snap set and a most recent active snap set to the mode transition cycle snap set (column 406).

Upon completion of the mode transition cycle, a post process is performed with custom functions for each of the replication modes. To enter sync replication mode, as the target transition cycle snap set is now equivalent to the source product consistency group, the active snap set is assigned to the transition cycle snap set and IO mirroring is continued from the consistency group to a most recent active snap set at the target system (column 404). To enter async replication mode, as the target transition cycle snap set is now equivalent to the source transition cycle snap set, async replication cycle scheduling is initiated (column 406). To enter metro replication mode, as the target transition cycle snap set is now equivalent to the source production consistency group, the consistency group is refreshed to the transition cycle snap set and bi-direction IO mirroring is initiated (column 408).

Figure 5:
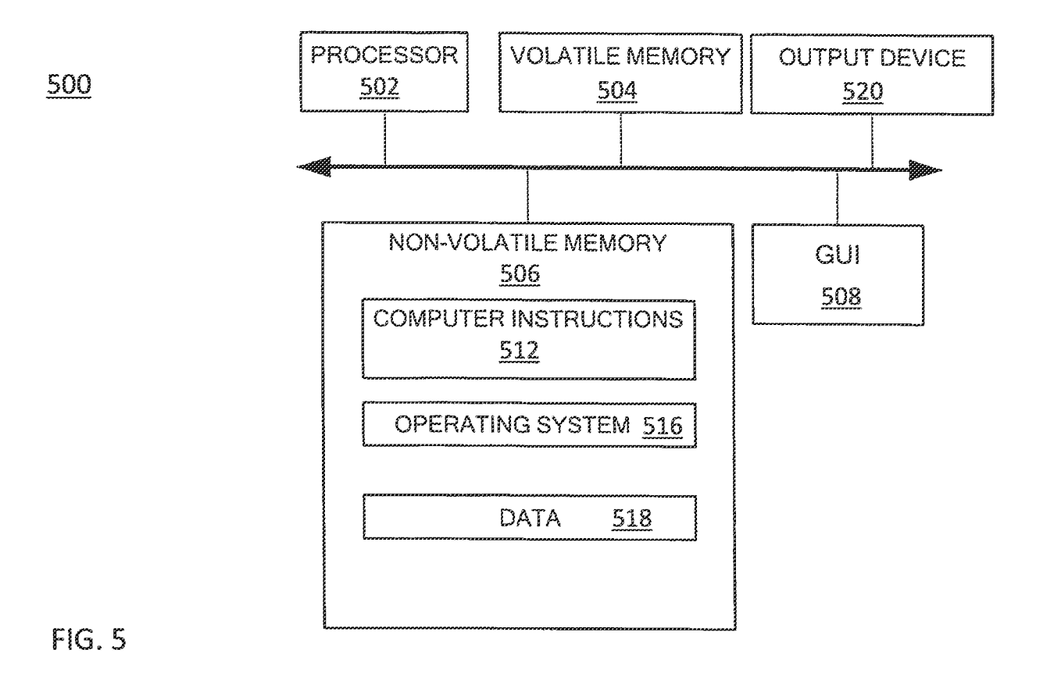
FIG. 5 is a block diagram of a hardware device that may perform at least a portion of the process shown in FIG. 3 and the framework depicted in FIG. 4.

In some embodiments, the source site 102 and/or target site 112 may be implemented as one or more computers, such as a computer 500 as shown in FIG. 5. Likewise, one or more devices and/or systems of FIG. 2 may be implemented by a computer, such as computer 500. Computer 500 may include processor 502, volatile memory 504 (e.g., RAM), non-volatile memory 506 (e.g., a hard disk drive, solid state drive such as a flash drive, a hybrid magnetic and solid state drive, etc.), graphical user interface (GUI) 508 (e.g., a mouse, a keyboard, a display, and so forth) and input/output (I/O) device 520. Non-volatile memory 506 stores computer instructions 512, an operating system 516 and data 518 such that, for example, the computer instructions 512 are executed by the processor 502 out of volatile memory 504 to perform at least a portion of the process 300 shown in FIG. 3 and the framework of FIG. 4. Program code may be applied to data entered using an input device of GUI 508 or received from I/O device 520.

Process 300 shown in FIG. 3 and framework shown in FIG. 4 are not limited to use with the hardware and software of FIG. 5 and may find applicability in any computing or processing environment and with any type of machine or set of machines that is capable of running a computer program. Process 300 and framework 400 may be implemented in hardware, software, or a combination of the two.

The processes described herein are not limited to the specific embodiments described. For example, process 300 is not limited to the specific processing order shown in FIG. 3. Rather, one or more blocks of process 300 may be re-ordered, combined or removed, performed in parallel or in serial, as necessary, to achieve the results set forth herein.

Processor 502 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general-purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow chart of FIGS. 3A-3C, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 6:
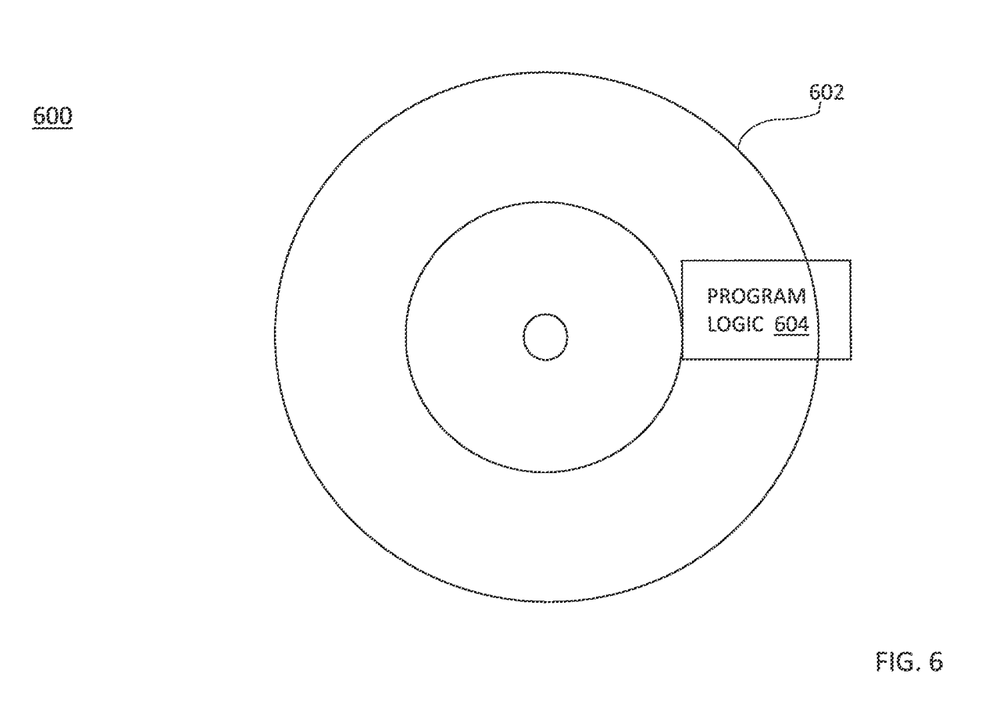
FIG. 6 is a simplified block diagram of an apparatus that may be used to implement at least a portion of the systems of FIGS. 1-2 and 4 and at least a portion of the process of FIG. 3 and the framework of FIG. 4.

For example, when the program code is loaded into and executed by a machine, such as the computer of FIG. 5, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 6 shows Program Logic 604 embodied on a computer-readable medium 602 as shown, and wherein the Logic is encoded in computer-executable code configured for carrying out the reservation service process of this invention and thereby forming a Computer Program Product 600. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method for seamless transitioning replication modes in a storage system, the method comprising:
    during an active replication session in which a first mode of replication is performed at the storage system:
        validating a precondition for transitioning to a second mode of replication, wherein the second mode of replication is different than the first mode of replication;
        suspending data flow for the active replication session;
        establishing a base snap set pair for a mode transition cycle;
        preparing for the transitioning from the first replication mode to the second replication mode including updating, for the mode transition cycle, the base snap set pair on both a source system and a target system of the storage system, and creating a snap set against an active snap set on the target system as a mode transition cycle snap set;
        implementing the mode transition cycle; and
        entering a replication session, upon completion of the mode transition cycle, for the second mode of replication.

2. The method of claim 1, wherein validating the precondition includes:
    for transitioning to async replication mode as the second mode of replication, determining availability of a recovery snap set pair for use as the base snap set pair during the transitioning; and
    for transitioning to sync or metro replication mode as the second mode of replication, determining availability of a synchronized snap set pair for use as the base snap set pair during the transitioning.

3. The method of claim 1, wherein suspending the data flow includes:
    when the first mode of replication is async mode, stopping IO mirroring in a data path for the active replication session; and
    when the first mode of replication is sync or metro mode, waiting for the active replication session to complete.

4. The method of claim 1, further comprising:
    wherein establishing the base snap set pair for the mode transition cycle includes:
    when the first mode of replication is async mode, the base snap set pair comprises a most recent synchronized snap set pair; and
    when the first mode of replication is sync or metro mode, the base snap set pair comprises a most recent recovery snap set pair, and
    wherein preparing for the transitioning from the first replication mode to the second replication mode includes creating a snap set against an active snap set on the target system as a mode transition cycle snap set.

5. The method of claim 4, wherein implementing the mode transition cycle includes:
    when the second mode of replication is async replication mode, setting recovery data replication flow from the source system to the target system; and
    when the second mode of replication is sync or metro replication, enabling IO mirroring on a consistency group at the source system.

6. The method of claim 5, wherein implementing the mode transition cycle further includes:
    when the second mode of replication is sync or metro replication mode, transferring a delta between the consistency group at the source system and a most recent base snap set from the mode transition cycle to the mode transition cycle snap set at the target system; and
    when the second mode of replication is async replication, creating a new transition cycle snap set against the consistency group on the source system, and transferring a delta between the new transition cycle snap set and a most recent active snap set to the mode transition cycle snap set.

7. The method of claim 1, wherein upon completion of the mode transition cycle, the method includes:
    when the second mode of replication is sync replication mode, assigning the active snap set to the transition cycle snap set and continuing IO mirroring from the consistency group to a most recent active snap set at the target system;

when the second mode of replication is metro replication mode, refreshing the consistency group to the transition cycle snap set, and initiating bi-directional IO mirroring; and when the second mode of replication is async replication mode, initiating async replication cycle scheduling.

8. A system for seamless transitioning replication modes in a storage system, the system comprising:
a memory comprising computer-executable instructions; and
a processor executing the computer-executable instructions, the computer-executable instructions when executed by the processor cause the processor to perform operations comprising:
during an active replication session in which a first mode of replication is performed at the storage system:
validating a precondition for transitioning to a second mode of replication, wherein the second mode of replication is different than the first mode of replication;
suspending data flow for the active replication session;
establishing a base snap set pair for a mode transition cycle;
preparing for the transitioning from the first replication mode to the second replication mode including updating, for the mode transition cycle, the base snap set pair on both a source system and a target system of the storage system, and creating a snap set against an active snap set on the target system as a mode transition cycle snap set;
implementing the mode transition cycle; and
entering a replication session, upon completion of the mode transition cycle, for the second mode of replication.

9. The system of claim 8, wherein validating the precondition includes:
for transitioning to async replication mode as the second mode of replication, determining availability of a recovery snap set pair for use as the base snap set pair during the transitioning; and
for transitioning to sync or metro replication mode as the second mode of replication, determining availability of a synchronized snap set pair for use as the base snap set pair during the transitioning.

10. The system of claim 8, wherein suspending the data flow includes:
when the first mode of replication is async mode, stopping IO mirroring in a data path for the active replication session; and
when the first mode of replication is sync or metro mode, waiting for the active replication session to complete.

11. The system of claim 8, wherein the operations further comprise:
wherein establishing the base snap set pair for the mode transition cycle includes:
when the first mode of replication is async mode, the base snap set pair comprises a most recent synchronized snap set pair, and
when the first mode of replication is sync or metro mode, the base snap set pair comprises a most recent recovery snap set pair, and
wherein preparing for the transitioning from the first replication mode to the second replication mode includes creating a snap set against an active snap set on the target system as a mode transition cycle snap set.

12. The system of claim 11, wherein implementing the mode transition cycle includes:

when the second mode of replication is async replication mode, setting recovery data replication flow from the source system to the target system; and
when the second mode of replication is sync or metro replication, enabling IO mirroring on a consistency group at the source system.

13. The system of claim 12, wherein implementing the mode transition cycle further includes:
when the second mode of replication is sync or metro replication mode, transferring a delta between the consistency group at the source system and a most recent base snap set from the mode transition cycle to the mode transition cycle snap set at the target system; and
when the second mode of replication is async replication, creating a new transition cycle snap set against the consistency group on the source system, and transferring a delta between the new transition cycle snap set and a most recent active snap set to the mode transition cycle snap set.

14. The system of claim 8, wherein upon completion of the mode transition cycle, the operations further include:
when the second mode of replication is sync replication mode, assigning the active snap set to the transition cycle snap set and continuing IO mirroring from the consistency group to a most recent active snap set at the target system;
when the second mode of replication is metro replication mode, refreshing the consistency group to the transition cycle snap set, and initiating bi-directional IO mirroring; and
when the second mode of replication is async replication mode, initiating async replication cycle scheduling.

15. A computer program product for seamless transitioning replication modes in a storage system, the computer program product embodied on a non-transitory computer readable medium and including instructions that, when executed by a computer causes the computer to perform operations comprising:
during an active replication session in which a first mode of replication is performed at the storage system:
validating a precondition for transitioning to a second mode of replication, wherein the second mode of replication is different than the first mode of replication;
suspending data flow for the active replication session;
establishing a base snap set pair for a mode transition cycle;
preparing for the transitioning from the first replication mode to the second replication mode including updating, for the mode transition cycle, the base snap set pair on both a source system and a target system of the storage system, and creating a snap set against an active snap set on the target system as a mode transition cycle snap set;
implementing the mode transition cycle; and
entering a replication session, upon completion of the mode transition cycle, for the second mode of replication.

16. The computer program product of claim 15, wherein validating the precondition includes:
for transitioning to async replication mode as the second mode of replication, determining availability of a recovery snap set pair for use as the base snap set pair during the transitioning; and
for transitioning to sync or metro replication mode as the second mode of replication, determining availability of a synchronized snap set pair for use as the base snap set pair during the transitioning.

17. The computer program product of claim 15, wherein the operations further comprise:

wherein establishing the base snap set pair for the mode transition cycle includes:

when the first mode of replication is async mode, the base snap set pair comprises a most recent synchronized snap set pair; and when the first mode of replication is sync or metro mode, the base snap set pair comprises a most recent recovery snap set pair; and wherein preparing for the transitioning from the first replication mode to the second replication mode includes creating a snap set against an active snap set on the target system as a mode transition cycle snap set.

18. The computer program product of claim 17, wherein implementing the mode transition cycle includes:

when the second mode of replication is async replication mode, setting recovery data replication flow from the source system to the target system; and when the second mode of replication is sync or metro replication, enabling IO mirroring on a consistency group at the source system.

19. The computer program product of claim 18, wherein implementing the mode transition cycle further includes:

when the second mode of replication is sync or metro replication mode, transferring a delta between the consistency group at the source system and a most recent base snap set from the mode transition cycle to the mode transition cycle snap set at the target system; and when the second mode of replication is async replication, creating a new transition cycle snap set against the consistency group on the source system, and transferring a delta between the new transition cycle snap set and a most recent active snap set to the mode transition cycle snap set.

20. The computer program product of claim 15, wherein upon completion of the mode transition cycle, the operations further include:

when the second mode of replication is sync replication mode, assigning the active snap set to the transition cycle snap set and continuing IO mirroring from the consistency group to a most recent active snap set at the target system;

when the second mode of replication is metro replication mode, refreshing the consistency group to the transition cycle snap set, and initiating bi-directional IO mirroring; and when the second mode of replication is async replication mode, initiating async replication cycle scheduling.

* * * * *